United States Patent
Subramaniam et al.

(10) Patent No.: US 10,034,026 B2
(45) Date of Patent: Jul. 24, 2018

(54) DEVICE FOR AND METHOD OF ENABLING THE PROCESSING OF A VIDEO STREAM

(71) Applicants: Akila Subramaniam, Dallas, TX (US); Manish Goel, Plano, TX (US); Hamid Rahim Sheikh, Allen, TX (US)

(72) Inventors: Akila Subramaniam, Dallas, TX (US); Manish Goel, Plano, TX (US); Hamid Rahim Sheikh, Allen, TX (US)

(*) Notice: Subject to any disclaimer, the term of this patent is extended or adjusted under 35 U.S.C. 154(b) by 42 days.

(21) Appl. No.: 15/135,878

(22) Filed: Apr. 22, 2016

(65) Prior Publication Data
US 2017/0309306 A1 Oct. 26, 2017

(51) Int. Cl.
- H04N 5/92 (2006.01)
- H04N 21/00 (2011.01)
- H04N 5/76 (2006.01)
- H04N 5/225 (2006.01)

(52) U.S. Cl.
CPC .................................. H04N 21/00 (2013.01)

(58) Field of Classification Search
CPC ............. H04N 5/92; H04N 5/76; H04N 5/225
USPC ............... 348/220.1, 222.1, 231.99; 386/326
See application file for complete search history.

(56) References Cited

U.S. PATENT DOCUMENTS

| | | | |
|---|---|---|---|
| 6,131,151 A * | 10/2000 | Graef | H04N 19/61 375/E7.094 |
| 6,198,773 B1 * | 3/2001 | Gill | H04N 19/61 348/716 |
| 8,213,501 B2 | 7/2012 | Boon et al. | |
| 8,428,125 B2 | 4/2013 | Oguz | |
| 8,990,435 B2 | 3/2015 | Cheng | |
| 9,100,251 B2 | 8/2015 | Taylor et al. | |
| 2005/0168589 A1 * | 8/2005 | Silverstein | H04N 5/23245 348/220.1 |
| 2009/0102916 A1 * | 4/2009 | Saishu | H04N 13/0048 348/54 |
| 2010/0014597 A1 * | 1/2010 | Gao | H04N 19/105 375/240.29 |
| 2011/0150085 A1 | 6/2011 | Andrijanic et al. | |
| 2012/0069922 A1 | 3/2012 | Taylor et al. | |
| 2012/0106622 A1 | 5/2012 | Huang | |
| 2012/0162511 A1 | 6/2012 | Hewes | |
| 2012/0183074 A1 | 7/2012 | Fuldseth | |
| 2013/0034160 A1 | 2/2013 | Schmit | |
| 2014/0254671 A1 | 9/2014 | Misra et al. | |
| 2014/0341278 A1 | 11/2014 | Zheng | |
| 2015/0139334 A1 | 5/2015 | Eregala | |
| 2015/0139603 A1 | 5/2015 | Silverstein et al. | |
| 2015/0172693 A1 | 6/2015 | Yang | |
| 2015/0187045 A1 | 7/2015 | Chou et al. | |
| 2015/0237373 A1 | 8/2015 | Touropis | |

FOREIGN PATENT DOCUMENTS

| WO | WO 2012058898 | 10/2012 |
|---|---|---|
| WO | WO 2012094232 | 12/2012 |

* cited by examiner

Primary Examiner — Daquan Zhao

(57) ABSTRACT

A method of enabling processing of a video stream is described. The method comprises establishing a slice width for frames of the video stream; receiving the video stream; dividing, for each frame of the video stream, the frame into vertical slices having the slice width; storing a frame of the video stream in a re-ordered slice based format. Computer-readable storage medium and a device for enabling processing of a video stream are also described.

18 Claims, 9 Drawing Sheets

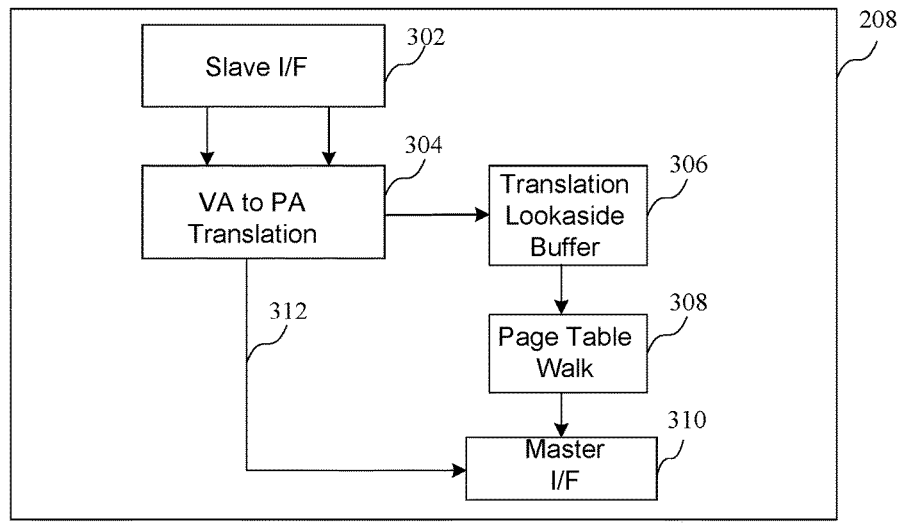
FIG. 3
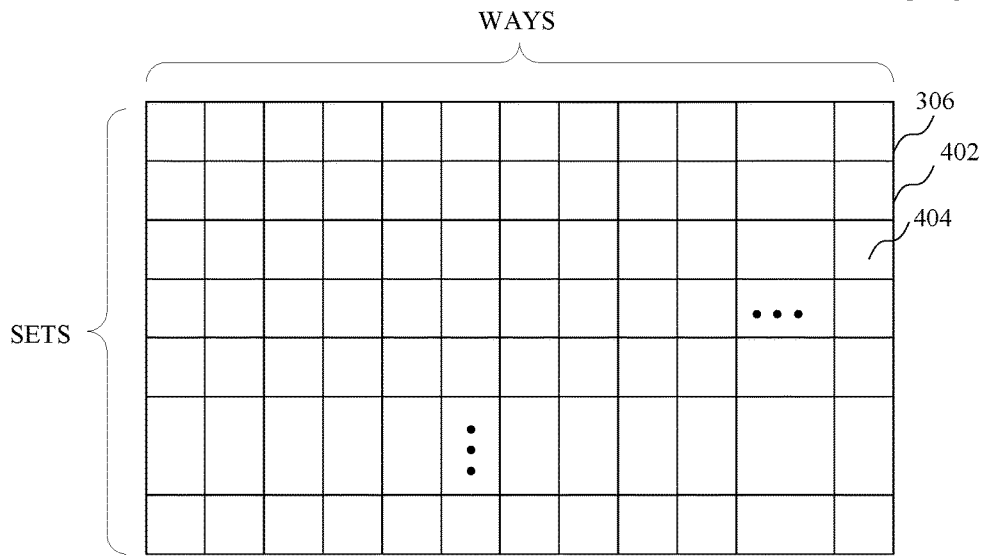
FIG. 4
| Set<br>VA[M:14] | Way | Tag<br>VA[31:N] | PA-0 | PA-1 | PA-2 | PA-3 |
|---|---|---|---|---|---|---|
| | | | Page 0<br>Address | Page 1<br>Address | Page 2<br>Address | Page 3<br>Address |
FIG. 5

DEVICE FOR AND METHOD OF ENABLING THE PROCESSING OF A VIDEO STREAM

FIELD OF THE INVENTION

An embodiment of present invention relates generally to image processing devices, and in particular, to a device for and a method of enabling the processing of images.

BACKGROUND OF THE INVENTION

Digital image processing has become very commonly used and is important in many fields. Digital image processing acquires an image from a sensor and transforms the image to viewable content. However, digital image processing, including multi-frame image processing, can require significant resources of an image processing device, such as a digital camera that may be implemented in a portable computer or communication device. When accessing data of a frame or multiple frames captured by an image processing device, the formatting of data is beneficial in reducing system latency and improving memory bandwidth. In modern SoCs, IPs typically access system memory (e.g. DDR) via a System MMU which provides contiguous (i.e. virtual) view of memory to the IPs and performs the virtual-to-physical address translation. The Virtual Address (VA) to Physical Address (PA) translation involves a first level translation lookup in the Translation Lookaside Buffer (TLB). A TLB is a memory cache that stores recent translations of virtual to physical addresses. When system needs to access memory using a physical address, it first checks if a virtual to physical address translation exists in the memory cache (TLB). If a translation is found, it is referred to as a "TLB hit". If it is not found, the system has to look for the physical mapping in the operating system's page table. This process is referred to as a "page table walk". Since this page table is in DRAM, it is a high latency and bandwidth intensive operation. To meet the high bandwidth requirements and avoid the additional memory latency incurred due to page table walk, it is important to achieve a TLB hit as much as possible. For example, the TLB hit rate is higher if tiles are fetched in raster order from left to right. However, if tiles need to be fetched from top to bottom, it will result in frequent cache misses. Frequent cache misses increase memory access latency since page entries are fetched from system memory, such as a dynamic random access memory (DRAM).

Accordingly, devices and methods that improve the processing of digital images, and more particularly devices and methods that reduce the number of TLB cache misses and the latency of memory accesses, are beneficial.

SUMMARY OF THE INVENTION

A method of enabling processing of a video stream is described. The method comprises establishing a slice width for frames of the video stream; receiving the video stream; dividing, for each frame of the video stream, the frame into vertical slices having the slice width; storing a frame of the video stream in a re-ordered slice based format.

Another method of enabling processing of a video stream comprises establishing a slice width for frames of the video stream; receiving the video stream; dividing, for each frame of the video stream, the frame into vertical slices having the slice width; and storing frames of the video stream in a tile and frame interleaved format.

A device for enabling processing of a video stream is also disclosed. The device comprises a memory management unit configured to receive frames of the video stream; divide, for each frame of the video stream, the frame into vertical slices having a slice width; and store a frame of the video stream in a re-ordered slice based format.

A computer-readable storage medium having data stored therein representing software executable by a computer for enabling processing of a video stream is also disclosed. The computer-readable storage medium comprises instructions for establishing a slice width for frames of the video stream; instructions for receiving the video stream; instructions for dividing, for each frame of the video stream, the frame into vertical slices having the slice width; and instructions for storing a frame of the video stream in a re-ordered slice based format.

Other features will be recognized from consideration of the Detailed Description and the Claims, which follow.

BRIEF DESCRIPTION OF THE DRAWINGS

FIG. 3 is a block diagram of the system memory management unit (MMU) of FIG. 2;

FIG. 4 is an example of a Translation Lookaside Buffer (TLB) of FIG. 3;

FIG. 5 is an example of an entry for the cache structure for the TLB of FIG. 4;

DETAILED DESCRIPTION

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Applications such as Multi-Frame Digital Zoom process multiple frames together to reduce noise artifacts from digital interpolation and improve image clarity. Processing multiple frames is a high bandwidth and latency critical operation. It involves fetching tiles from multiple frames together for subsequent warping, blending and other kernel operations. The devices and methods set forth below implement data reordering, wherein a processing entity reads frame data and stores data to match with tile processing order based on a single sensor, single frame system, a single sensor, multi-frame system or multi sensor, multi-frame system. In each case, the novel data organization significantly reduces the TLB cache miss rate.

Figure 1:
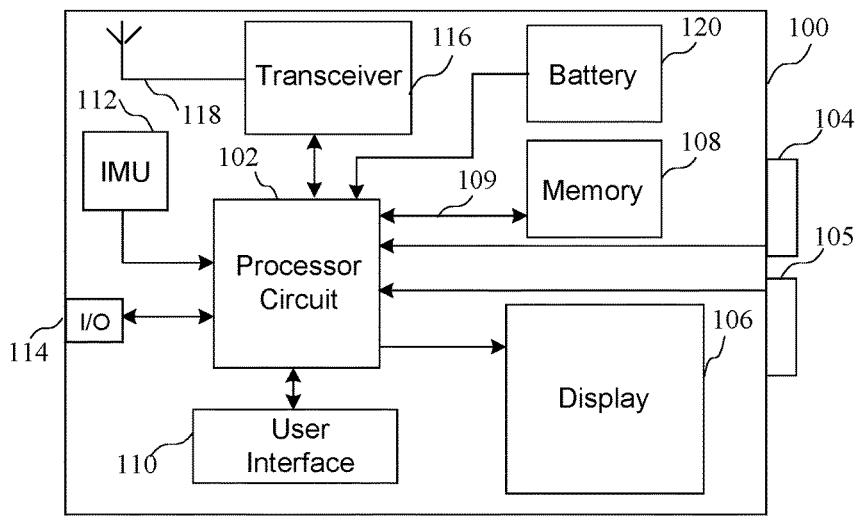
FIG. 1 is a block diagram of a device for processing a video stream.

Turning first to FIG. 1, a block diagram of a device for the processing of a video stream is shown. In particular, a device 100 comprises a processor circuit 102 coupled to an image sensor 104. The device 100 could be any type of device, or a component such as an integrated circuit of a device or system, adapted to capture a digital image. The image sensor 104 could be a digital camera, or any portion of a digital camera, such as a lens or other image sensing element. A second image sensor 105 could also be implemented, as will be described in more detail below. The processor circuit could be coupled to a display 106 for displaying a captured image, and more particularly, displaying a digital image having enhanced image quality. As will be described in more detail below in reference to FIG. 2, the processor circuit, alone or in combination with other elements, can enable processing a video stream.

The processor circuit 102 may also be coupled to a memory 108 that enables storing information related to various frames of an image. The memory 108 could be implemented as a part of the processor circuit 102, or could be implemented in addition to any cache of the processor, as is well known. The memory 108 could be connected to the processor circuit 102 by way of interconnect elements, such as interconnect element 109. A user interface 110, which may be separate from the display, or also may be a part of, or responsive to, the display, is also shown. The processor circuit 102 may also be coupled to other elements that receive inputs or enable the capturing of a digital image. For example, an inertial measurement unit (IMU) 112 can provide various information related to the motion or orientation of the device 100. The processor circuit 102 may also receive input by way of an input/output (I/O) port 114 or a transceiver 116 coupled to an antenna 118. A battery 120 may be implemented to provide power to the processor circuit and other elements of the device 100.

Figure 2:
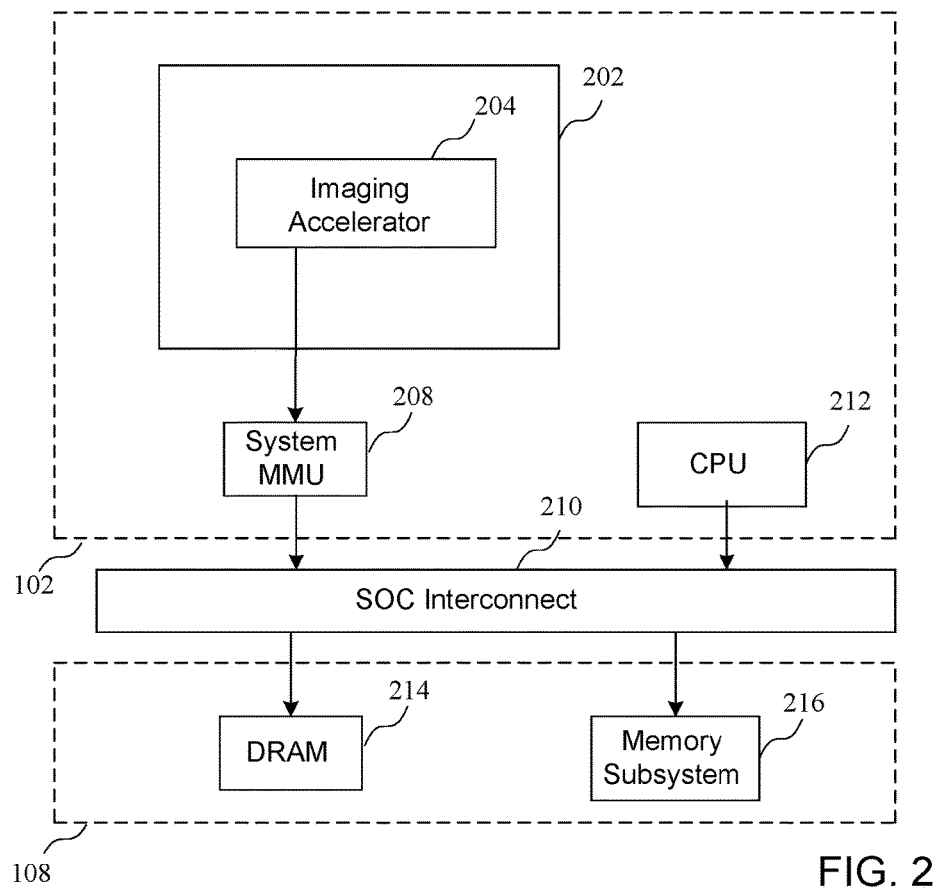
FIG. 2 is a block diagram showing processing blocks implemented in the device of FIG. 1 for processing a video stream.

Turning now to FIG. 2, a block diagram shows processing blocks implemented in the device of FIG. 1 for processing a video stream. A virtual address block 202 comprises an imaging accelerator block 204 that provides image data to a memory management unit (MMU), such as a system MMU 208. The imaging accelerator block 204 performs data re-ordering, as will be described in more detail below. The system MMU 208 communicates with other elements of the device by way of a system-on-chip (SOC) interconnect element 210, which could be implemented as interconnect element 109 for example. The processing circuit 102 could comprise a central processing unit (CPU) 212. The memory 108 could comprise a dynamic random access memory (DRAM) 214 or a memory subsystem 216.

Turning now to FIG. 3, a block diagram of the system MMU of FIG. 2 is shown. More particularly, the system MMU 208 comprises a slave interface 302 configured to provide image data from the virtual address block 202 to a virtual address-to-physical address translation block 304, the output of which is coupled to a TLB 306. A TLB is a set associative cache operating as an address translation cache, where each entry in the TLB has 4 pages with a page size of 4 KB for example. Depending upon the results of the search of entries in the TLB, if a search results in a miss in the TLB cache, a page table walk block 308 will make a request by way of a master interface 310 to a memory, such as the DRAM 214 for example. If the TLB cache access is a hit, the data access will be forwarded to system memory 214 via 310.

In a modern system-on-chip (SoC), intellectual property blocks (IPs) typically access system memory (e.g. dynamic random access memory (DRAM)) via the System MMU, which provides a contiguous (virtual) view of memory to the IPs and performs the virtual-to-physical address translation. The virtual address to physical address translation involves a translation lookup in the TLB 306, where a page table walk follows a TLB miss. To avoid the penalty due to page table walk, it is desirable to have a TLB hit as much as possible. The arrangement of address information associated with frames of an image will increase the chances of a TLB hit, as will be described in more detail below.

Turning now to FIG. 4, an example of the TLB 306 implemented as a cache memory of FIG. 3 is shown. The TLB 306 includes a number of sets, shown in the rows 402, where each row has a number of ways 404. As shown in FIG. 5, each entry of the cache memory (i.e. a given way associated with a set) comprises a portion of a virtual address that identifies a set (e.g. VA[M:14] where M=14+log 2(#sets)−1, a way associated with the set, a tag (e.g. VA[31:N] where N=M+1), and physical addresses associated with data, shown here as a physical address associated with four pages (page 0-page3). Each page is assumed to be of size 4 KB. As shown by the cache structure, each way has 4 page entries or 4 slots. A slot is hit when the upper address bits 31:N of the incoming virtual address match the stored tag in a given set. A total number of DRAM page slots is equal to 4*#sets*#ways, where the factor 4 indicates storing addresses for 4 DRAM pages per line of cache. Typically, larger number of ways has higher penalty in gate area as compared to increased number of sets. Therefore, there is an incentive to reduce number of ways. As will be described in more detail below, the implementation of the cache enables reducing the number of ways. It should be understood that the cache of FIG. 4 and the example entry of FIG. 5 are shown by way of example, and could be implemented in a variety of ways.

Figure 6:
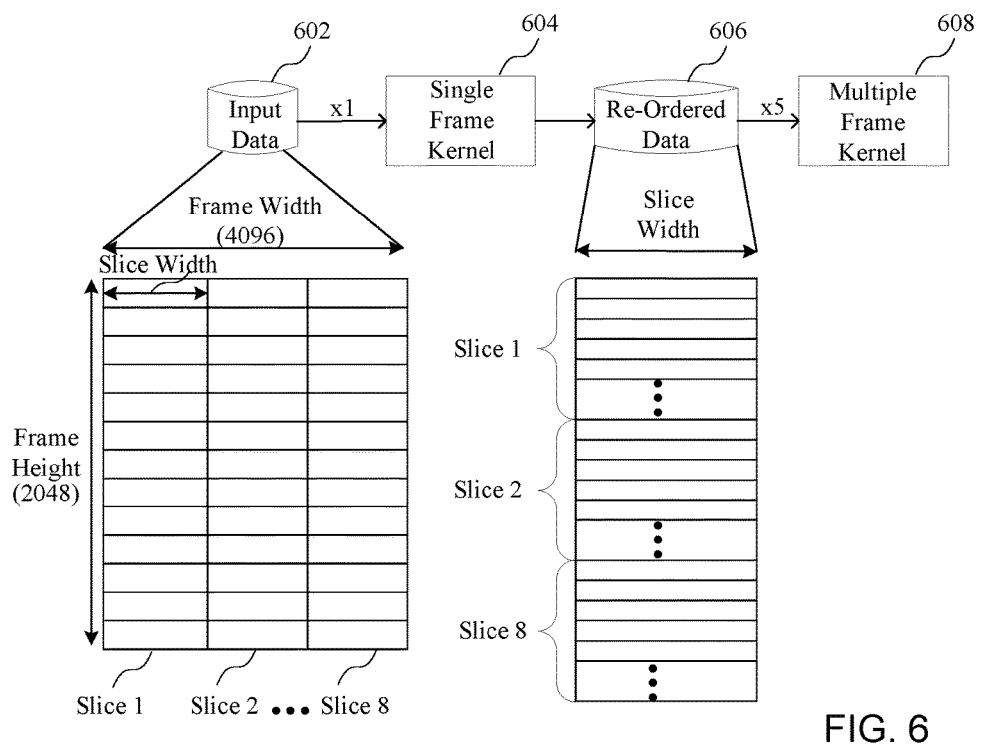
FIG. 6 is a block diagram showing a method of re-ordering frame information based upon slices of the frame.

Turning now to FIG. 6, a block diagram shows a method of reordering data based upon slices of the frame. An input frame 602 is divided into slices, where the frame having a frame width is divided into slices having a slice width. A slice is a portion of the frame that spans a fraction of the image width and the entire image height. Each slice has a plurality of tiles that are arranged in a column, where each tile comprises an array of pixels. For example, the maximum slice width may be 512 pixels and slice height may be 2048 pixels. The slice widths for a plurality of slices are generally the same, although a last slice may have a different width, as will be described in more detail below. A single frame kernel 604 operating at a rate of 1× provides re-ordered frame information that is arranged in a vertical format, where the slices are arranged from a first slice (i.e. slice 1) to a last slice (i.e. slice 3) in contiguous addresses of the memory 214 as shown. The slice arrangement shown in FIG. 7 enables a subsequent kernel to read tile by tile of the reordered data 706 starting from the 1$^{st}$ slice that matches the processing order of its algorithm. As will be described in more detail in reference to FIG. 8, the multi-frame kernel 708 operates at 5×, such as 150 frames per second, or 5 times the single frame rate of 30 frames per second.

An example of reading vertical slices from a frame is shown in FIG. 6. The example shown in FIG. 6 has a frame with image width of 4096 pixels and image height of 2048 pixels and slice width of 512. A data transfer unit such as a DMA will read data in bursts of size that is based on DRAM memory bursts, such as a 64 byte for memory burst. Unlike a conventional implementation that has a peak cache miss rate of 1 every 32 memory bursts, the arrangement of FIG. 6 results in a reduced cache miss rate of 1 every 256 memory bursts which is 8× improvement in cache miss rate.

In a single sensor, multi-frame system, a data transfer unit can store the image data in a frame interleaved format, where tiles from the multiple frames are stacked next to each other. Such a data organization not only reduces the cache miss rate, but also reduces the number of ways in the TLB to handle multiple frames. The impact of reduced ways is more significant if the frame has NV12 format and has separate luma and chroma planes. The NV12 format is one where the luma (Y) samples are arranged in an array followed by interleaved chroma (Cb and Cr) samples. With this format, the number of ways per set can be reduced to 2 ways as compared to at least 10 ways when processing 5 luma (Y) and 5 chroma (UV) frames. That is, the 5 Y values are interleaved to use a single way, and the 5 UV values are interleaved to use a single way.

Multi-frame processing is bandwidth intensive and latency critical. Fetching multiple tiles or lines from multiple frames increases the number of parallel threads, which increase the number of ways in the System MMU cache. Given tile height, frame dimensions and number of frames, it is possible to determine the number of DRAM slots that will be needed as follows:

DRAM page slots=(#frames*Image Width*Tile Height)/DRAM Page size;

for a horizontal processing order of tiles.

DRAM page slots=(#frames*Image Width*Image Height)/DRAM Page size;

for a vertical processing of tiles. By way of example, for a 8 megapixel (MP) image size with image width=4096 pixels and image height=2048 pixels and tile size=4 Kilobyte (KB) with tile width=512 pixel and tile height=8 pixels, number of frames=5, the number of DRAM page slots for horizontal processing order for a 4096 byte (i.e. 4 Kbyte) page size can be calculated as:

DRAM page slots=(5*4096*4)/4096=20.

The tile processing is done vertically rather than horizontally in order to reduce the overall system latency for the application. This is also called slice processing, and may be implemented for a multi-frame zoom application. In the case of slice processing, the overall tile height is a combination of all the tiles in one vertical slice, which in the above example is 2048. Therefore, the number of DRAM page slots with the new tile height, which is same as image height, is calculated by:

DRAM page slots=(5*4096*2048)/4096=10,240.

To keep up with the processing latency requirement, the total number of DRAM slots is increased.

For some applications such as zoom applications, only a 2× cropped image is fed into multi-frame processing block. Therefore, the image width and height are each reduced by 2×. For some image processing protocols there may be 2 planes, one for Luma and another for Chroma. However, the number of effective frames is increased by 1.5× because Chroma frame is 50% of the Luma frame in a 4:2:0 format. Therefore, number of DRAM page slots needed are calculated as:

DRAM page slots=(5*1.5*2048*1024)/4096=3,840.

In addition, the number of ways is given by the number of frames which is 10. This means that we need a system MMU with #ways=10, #sets=96 (where the next power of two greater than 69 is 128) is needed, with a number of slots per TLB cache entry=4, which makes TLB page size to be 4×128×10=5120 pages. This has significant area and power penalty. However, this can be reduced by interleaving the address information, where 5 Luma frames are interleaved and 5 chroma frames are interleaved to reduce the number of ways from 10 to 2, as will be described.

Multi-frame processing is implemented at low latency to reduce System MMU TLB cache misses by storing data in tile and frame interleaved manner to match the processing order of the device as will be described in reference to FIGS. 7 and 8. The novel data organization not only reduces memory latency and increases cache hit performance, but accomplishes it with a small System MMU TLB cache size. To reduce System MMU cache miss and to reduce the memory fetch latency, images are divided into vertical slices. The multi-frame image processing involves a single frame processing entity such as crop and filter stage that works on a single frame and reads the frame as a set of tiles starting from the first vertical slice. For the first slice, each line is offset by the image stride. For a next slice, each line is offset by the slice width as compared to the first slice. While the crop and filter stage working on a single frame generally tolerate the additional latency caused by frequent cache misses, the additional latency caused by frequent cache misses is a problem when implementing multi-frame processing. Re-ordering the data as set forth below reduces the cache misses, and therefore reduces the latency in multi-frame processing.

Figure 11:
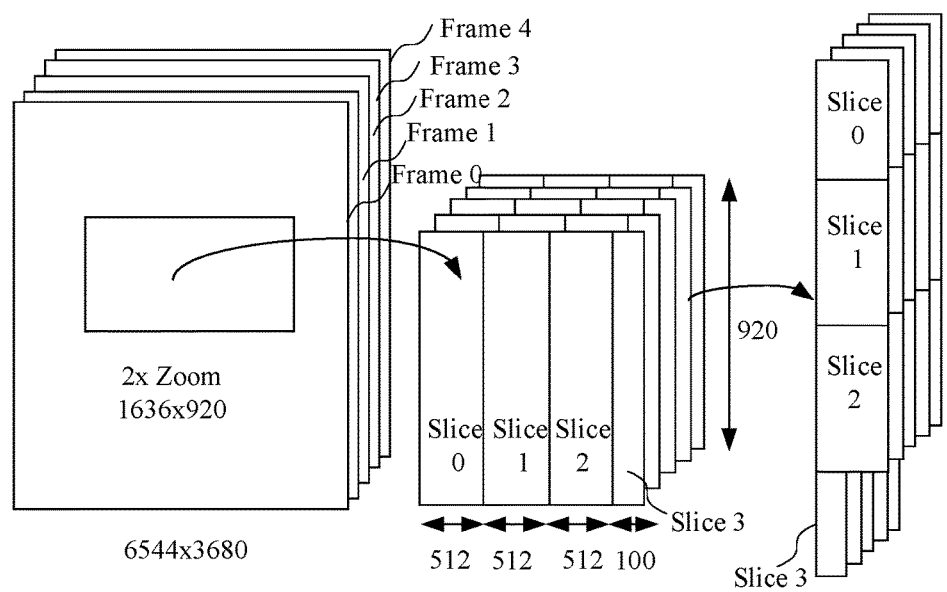
FIG. 11 is a block diagram showing a division of a frame into slices having unequal slice sizes.
Figure 12:
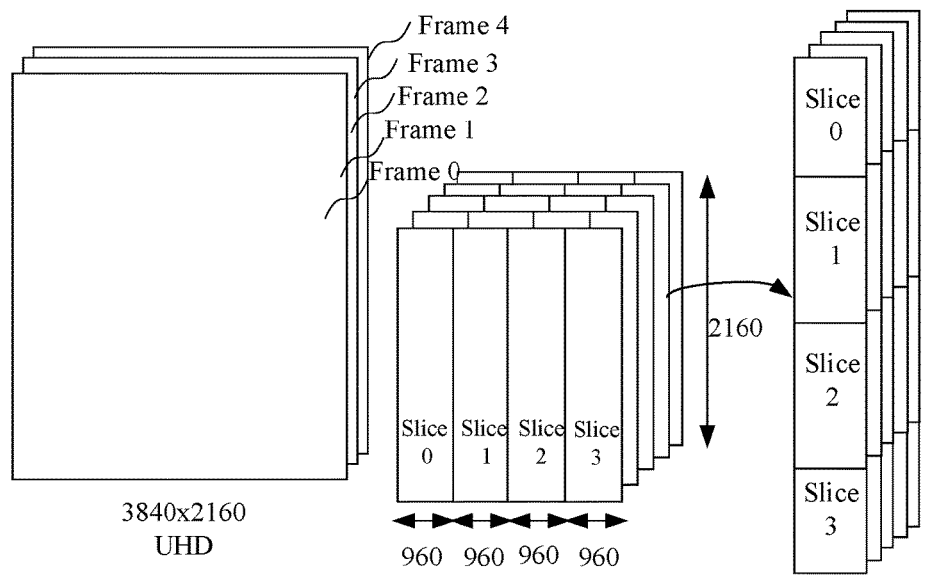
FIG. 12 is a block diagram showing a division of a frame into slices having equal slice sizes.

The vertical slice width may be determined from the image resolution, kernel or algorithm requirements on line buffer sizes, or any image transformations that may be applied to the image, such as warp or rotation. In the example shown in FIG. 11 below, the cropped frame is scaled down 2× from the sensor resolution of 24 MP. The frame is divided into 4 vertical slices with widths of 512 pixels for first 3 slices and 100 pixels for 4$^{th}$ slice. However, in the example of FIG. 12, a UHD frame is wider and may have wider slices to accommodate for the larger stride of 960 pixels. In addition, the slice width is also a multiple of 64B which is efficient for external memory bursts.

Subsequent reading of the tiles may be performed in raster scan order by a multi frame processing kernel which is processing N frames. Since the buffer stride is the slice width (e.g. 512 pixels if the slice width is 512), every page entry within a cache set is fully utilized. The resulting cache miss is 1 every 256 memory accesses. A slight increase in storage could result due to overlap of tiles, but it is offset by the latency reduction and subsequent bandwidth gain due to significantly reduced cache miss rate.

Figure 7:
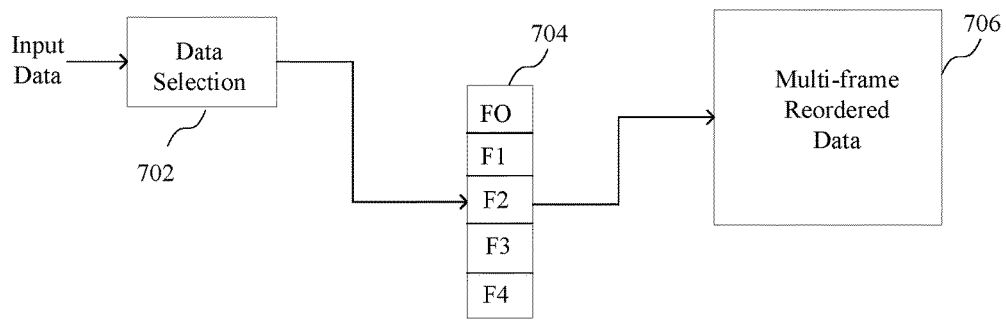
FIG. 7 is a block diagram showing the re-ordering of multiple frames of frame information.

Turning now to FIG. 7, a block diagram shows the re-ordering of multiple frames of data. As shown in FIG. 7, a data selection block 702 enables the selection of input frames 704, shown here as five frames F0-F4. The input frames 704 are then reordered as multi-frame reordered data 706. An example of the reordering data from the input frames 704 to the multi-frame reordered data 706 is shown in more detail in reference to FIG. 8. In particular, each of the five frames is divided into 3 slices. While 3 slices are shown by way of example, it should be understood that the frames could be divided into any number of slices, where each of the frames is divided in the same manner. Accordingly, while the input data 802 is provided to a single kernel 804 operating at a 1× rate, reordered data 806 is generated based upon the multiple frames of data, where a multiple frame kernel 808 can operate on the multiple frames of data at a 5× rate.

Figure 8:
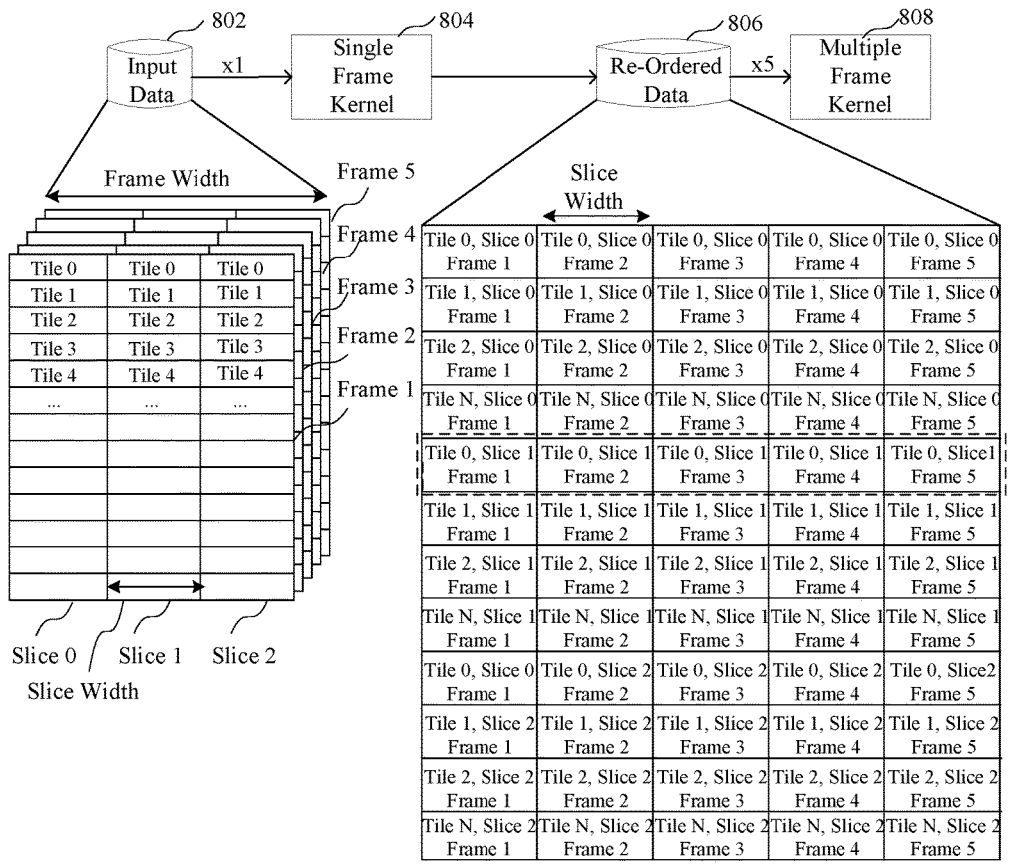
FIG. 8 is a block diagram showing the re-ordering of multiple frames of frame information based upon slices of the frame.

As shown in FIG. 8, the tiles from multiple frames are stacked next to each other such that a blending algorithm processing a set of 5 frames, reads in a tile and frame interleaved manner (such as tile 0 frame 0, tile 0 frame 1, tile 0 frame 2 etc). Because the data for the multiple frames will be read from the memory and used for image processing, such as blending for example, storing the information together in the row enables faster reading of the pixel data associated with multiple frames. This data formatting consumes only a single way within a set in the TLB cache. In the absence of such a format, the tiles for each frame need to be fetched from different address locations in memory. Each non-contiguous frame requires a way within a set. For 5 frames, this would require 5 ways.

Figure 9:
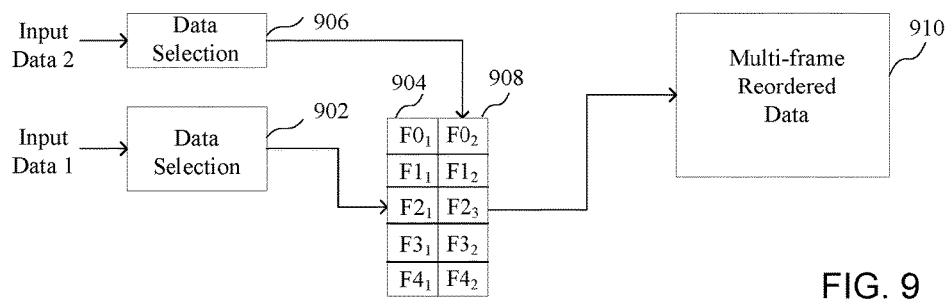
FIG. 9 is a block diagram showing the re-ordering of multiple frames of frame information using multiple image sensors.
Figure 10:
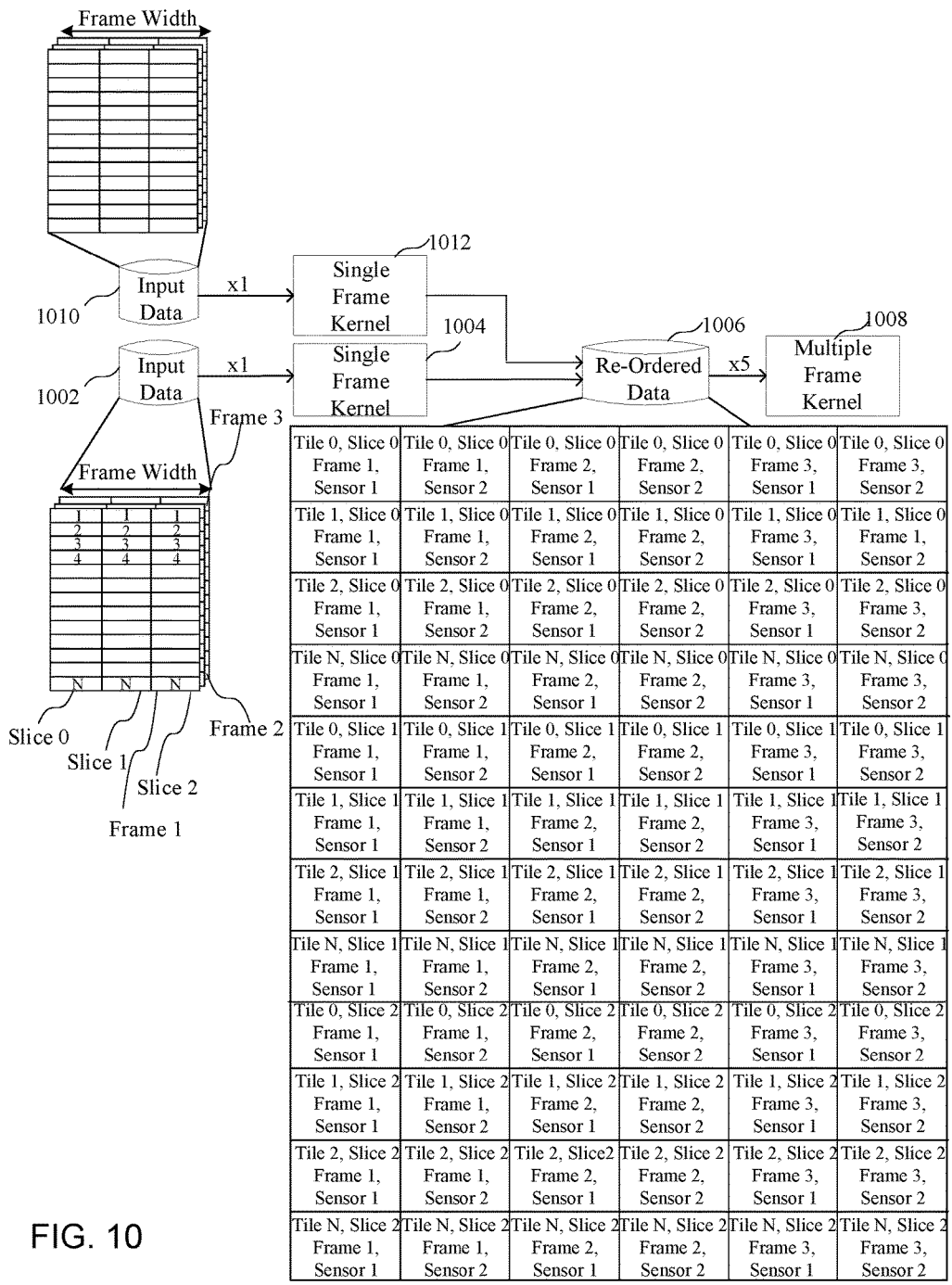
FIG. 10 is a block diagram showing the re-ordering of multiple sensors and multiple frames of frame information and based upon slices of the frame.

In a multi-sensor, multi-frame system, the data transfer unit stores the data in the interleaved order based upon tile, frame and sensor count. This type of data organization also reduces the cache miss rate with reduced number of ways in the TLB cache which might otherwise be needed to handle multiple frames and multiple sensors. As shown in FIGS. 9 and 10, the re-ordering of information associated with multiple frames of data using multiple image sensors can be implemented to enable tile, frame and sensor interleaving. A data selection block 902 of FIG. 9 enables the selection of input frames 904, shown here as five frames $F0_1$-$F4_1$. Second data from a second sensor is also provided. In particular, a second data selection block 906 enables the selection of input frames 908, shown here as five frames F02-F42. Data from each of the data selection blocks can then be reordered as multi-frame reordered data 910 as shown in FIG. 10.

More particularly, the block diagram of FIG. 10 shows the re-ordering of multiple sensors and multiple frames of data and based upon slices of the frames associated with the first sensor. The input data 1002 having multiple frames of data is provided to a single kernel 1004 operating at a 1× rate. Reordered data 1006 is generated based upon the multiple frames of data, where a multiple frame kernel 1008 can operate on the multiple frames of data at a 5× rate. The re-ordered data can also include frames generated by a second sensor. Second input data 1010 having multiple frames of data is provided to a second single kernel 1012 operating at a 1× rate. The reordered data 1006 is shown with tile, frame and sensor interleaving. That is, data associated with the first sensor (sensor 1) may be interleaved in a tile and frame format in a first block of data as described in reference to FIG. 8, where data associated with the second sensor (sensor 2) is interleaved in a tile and frame format with the data associated with the first sensor. Therefore, the data is interleaved in a tile, frame sensor format. That is, the data could be interleaved as tileN/frame1/sensor1 followed by tileN/frame1/sensor 2, followed by tileN/frame2/sensor1, followed by tileN/frame2/sensor 2, as shown in FIG. 10.

Figure 13:
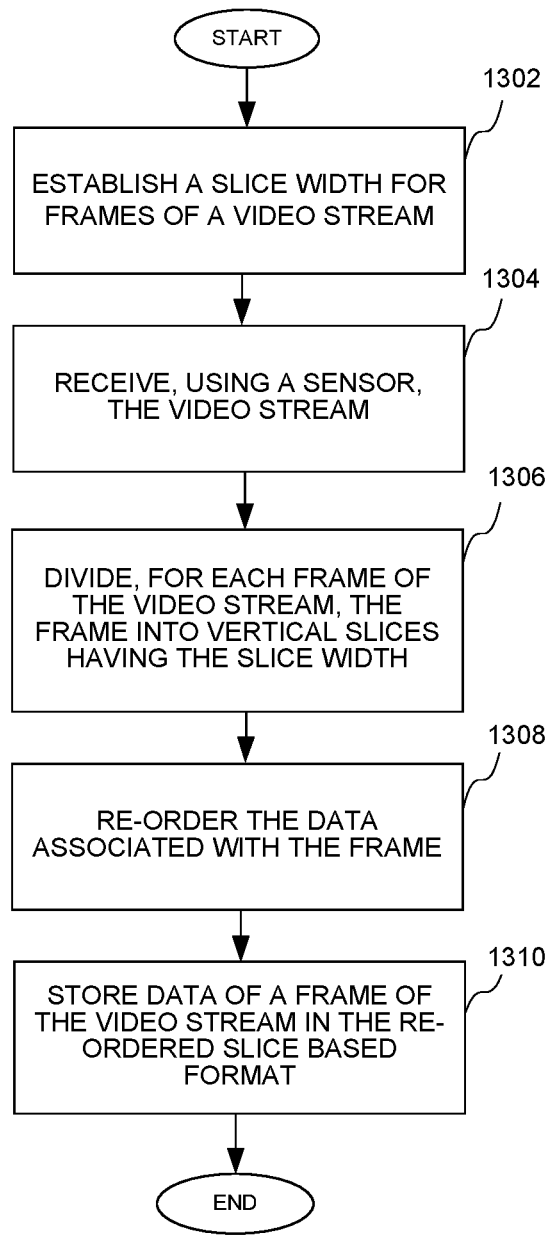
FIG. 13 is a flow chart showing a method of enabling processing of a video stream by storing a frame of a video stream in a re-ordered format.

Various methods of enabling processing a video stream are now described. Turning first to FIG. 13, a flow chart shows a method of enabling processing of a video stream by storing data of a frame of a video stream in a re-ordered format. A slice width for frames of the video stream is established at a block 1302. The video stream is received using a sensor at a block 1304. For each frame of the video stream, the frame is divided into vertical slices having the slice width at a block 1306. The vertical slices could be implemented as shown in any of the FIG. 6-8 or 11-12, for example. The data associated with the frame is re-ordered at a block 1308. Data of a frame of the video stream in the re-ordered slice based format is stored at a block 1310, wherein data of a plurality of slices of data of a frame are stored in memory in order from a first slice to a last slice. Data associated with a single frame can be re-ordered as shown in FIG. 8, for example.

Figure 14:
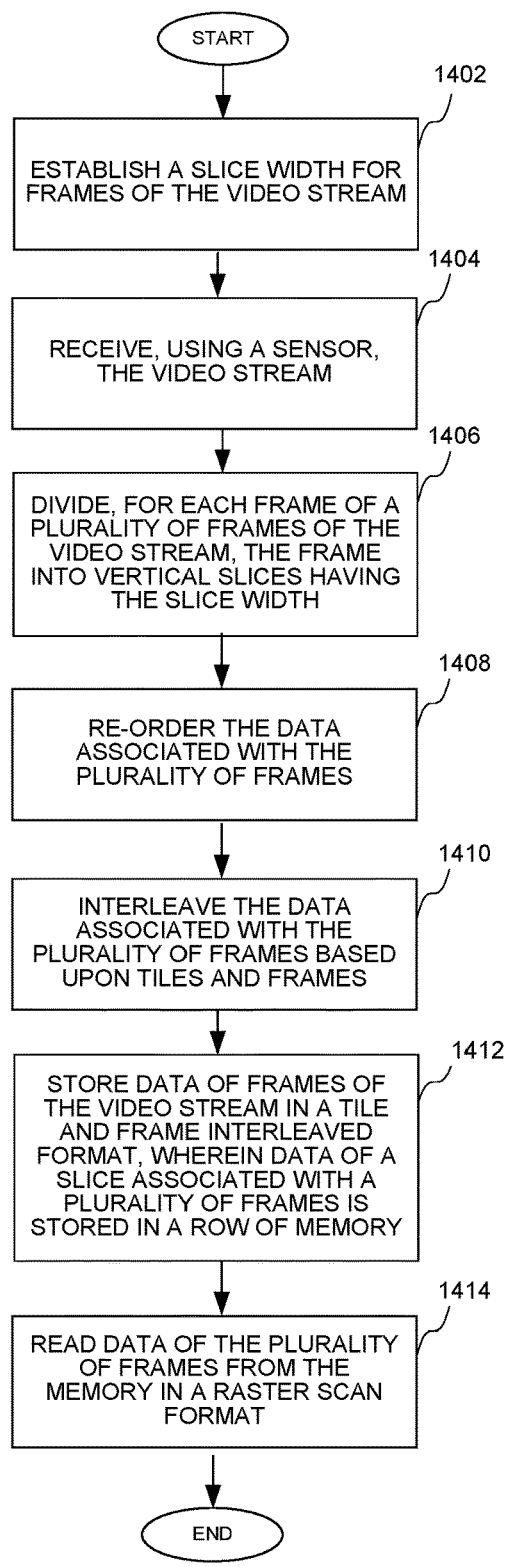
FIG. 14 is a flow chart showing a method of enabling processing of a video stream by interleaving a plurality of frames.

Turning now to FIG. 14, a flow chart shows a method of enabling processing of a video stream by interleaving data associated with a plurality of frames. A slice width for frames of the video stream is established at a block 1402. The video stream is received using a sensor at a block 1404. The frame, for each frame of a plurality of frames of the video stream, is divided into vertical slices having the slice width at a block 1406. The data associated with the plurality of frames is re-ordered at a block 1408. The data associated with the plurality of frames is interleaved based upon tiles and frames at a block 1410. Data of frames of the video stream is stored in a tile and frame interleaved format at a block 1412, wherein data of a slice and tile associated with a plurality of frames is stored in memory. Data associated with multiple frames can be re-ordered as shown in FIG. 8, for example. Data of the plurality of frames is read from the memory in a raster scan format at a block 1414.

Figure 15:
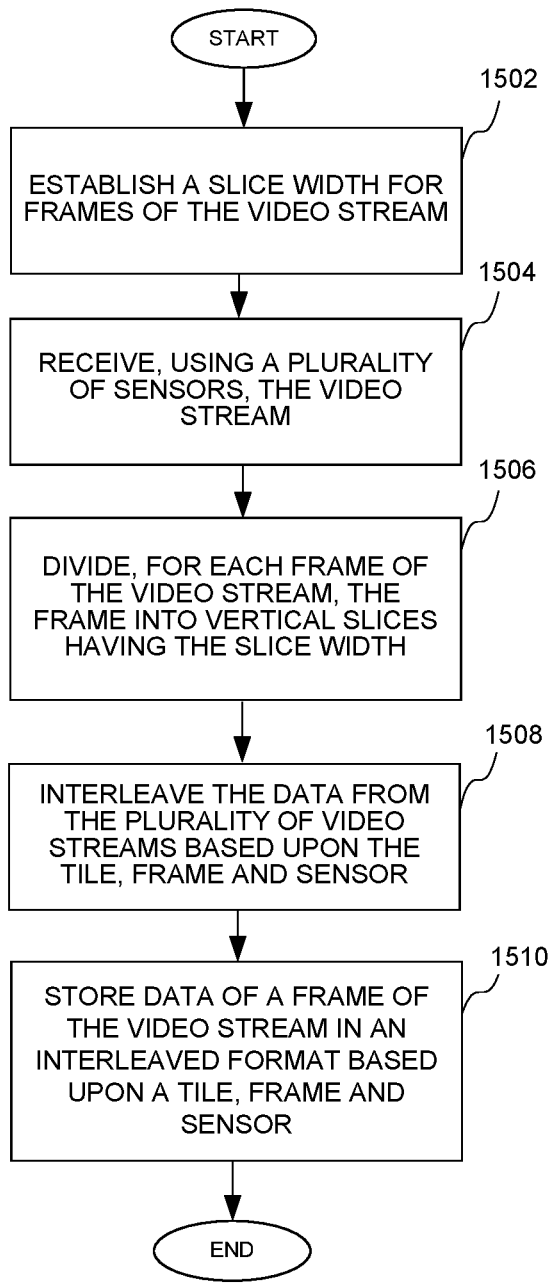
FIG. 15 is a flow chart showing a method of enabling processing of a video stream by interleaving a plurality of frames from a plurality of sensors.

Turning now to FIG. 15, a flow chart shows a method of enabling processing of a video stream by interleaving data associated with a plurality of frames from a plurality of sensors. A slice width for frames of the video stream are established at a block 1502. The video stream is received using a plurality of sensors at a block 1504. The frame, for each frame of the video stream, is divided into vertical slices having the slice width at a block 1506. The data from the plurality of video streams are interleaved based upon the tile, frame and sensor at a block 1508. Data of a frame of the video stream is stored in an interleaved format based upon a tile, frame and sensor, wherein data of a plurality of slices associated with a frame is stored in memory at a block 1510. The interleaving of information associated with a plurality of frames can be performed as described above in reference to FIG. 10, for example. The methods of FIGS. 13-15 could be implemented using any of the circuits of FIGS. 1-12, or other suitable circuits.

It can therefore be appreciated that new to devices for and methods of enabling processing of a video stream have been described. It will be appreciated by those skilled in the art that numerous alternatives and equivalents will be seen to exist that incorporate the disclosed invention. As a result, the invention is not to be limited by the foregoing embodiments, but only by the following claims.

We claim:

1. A method of enabling processing of a video stream, the method comprising:
   establishing a slice width for frames of the video stream;
   receiving the video stream;
   dividing, for each frame of the video stream, the frame into vertical slices having the slice width; and
   storing, for each frame of multiple frames of the video stream, the frame in a re-ordered format;
   wherein the re-ordered format comprises data of the vertical slices of the frame stored in contiguous addresses of a memory; and
   wherein the multiple frames are aligned in a frame and sensor interleaved format in a row of the memory, and data for a plurality of sensors is interleaved for each frame.

2. The method of claim 1 wherein the vertical slices extend from a top of the frame to a bottom of the frame.

3. The method of claim 1 wherein storing the vertical slices of the frame in the memory comprises storing data in order from a first slice to a last slice.

4. The method of claim 1 wherein the slice width is a multiple of 64 bits.

5. A method of enabling processing of a video stream, the method comprising:
   establishing a slice width for frames of the video stream;
   receiving the video stream;
   dividing, for each frame of the video stream, the frame into vertical slices having the slice width;
   storing, for each frame of the video stream, the frame in a re-ordered format comprising data of the vertical slices of the frame in contiguous addresses of a memory; and
   storing the multiple frames of the video stream in a frame interleaved format;
   wherein data associated with corresponding tiles of the multiple frames of the video stream are aligned in a row of memory.

6. The method of claim 5 wherein storing the plurality of slices comprises storing the slices in order from a first slice to a last slice.

7. The method of claim 5 further comprising receiving a second plurality of frames associated with a second video stream captured by a second sensor.

8. The method of claim 7 further comprising storing the multiple frames of the video stream and multiple frames of the second video stream in a frame and sensor interleaved format, wherein data for a plurality of sensors is interleaved for each frame.

9. A device for enabling processing of a video stream, the device comprising:
   a processor circuit configured to implement a memory management unit to:
   receive frames of the video stream;
   divide, for each frame of the video stream, the frame into vertical slices having a slice width; and
   store, for each frame of multiple frames of the video stream, the frame in a re-ordered format;
   wherein the re-ordered format comprises data of the vertical slices of the frame stored in contiguous addresses of a memory; and
   wherein the memory management unit is configured to store the multiple frames of the video stream in a frame interleaved format, and corresponding tiles of the multiple frames are aligned in a row of the memory.

10. The device of claim 9 wherein the memory management unit is configured to store the vertical slices of a frame in order from a first slice to a last slice.

11. The device of claim 9 wherein the memory management unit is configured to store, for each frame of the multiple frames, the frame in the memory from a first slice of the frame to a last slice of the frame.

12. The device of claim 9 wherein the memory management unit is configured to process address information of frames of a plurality of image streams generated by a plurality of sensors.

13. The device of claim 12 wherein frames of the plurality of image streams are stored in a frame and sensor interleaved format, and data for a plurality of sensors is interleaved for each frame.

14. A non-transitory computer-readable storage medium having data stored therein representing software executable by a computer for enabling processing of a video stream, the computer-readable storage medium comprising:
   instructions for establishing a slice width for frames of the video stream;
   instructions for receiving the video stream;
   instructions for dividing, for each frame of the video stream, the frame into vertical slices having the slice width; and
   instructions for storing, for each frame of multiple frames of the video stream, the frame in a re-ordered format;
   wherein the re-ordered format comprises data of the vertical slices of the frame stored in contiguous addresses of a memory; and
   instructions for storing the multiple frames of the video stream in a frame interleaved format, and corresponding tiles of the multiple frames are aligned in rows of the memory.

15. The non-transitory computer-readable storage medium of claim 14 wherein the computer-readable storage medium further comprises instructions for storing, for each frame of the multiple frames, data of the vertical slices in a column of the memory in order from a first slice to a last slice.

16. The non-transitory computer-readable storage medium of claim 14 wherein the computer-readable storage medium further comprises instructions for storing address information for each frame of the multiple frames in a re-ordered format, and storing, for each frame of the multiple frames, the frame in the memory from a first slice of the frame to a last slice of the frame.

17. The non-transitory computer-readable storage medium of claim 14 wherein the computer-readable storage medium further comprises instructions for processing address information of frames of a plurality of image streams generated by a plurality of sensors.

18. The non-transitory computer-readable storage medium of claim 14 wherein the computer-readable storage medium further comprises instructions for storing frames of the plurality of image streams in a frame and sensor interleaved format, wherein data for a plurality of sensors is interleaved for each frame.

* * * * *